US012637321B2

(12) United States Patent
Simmonds et al.

(10) Patent No.: US 12,637,321 B2
(45) Date of Patent: May 26, 2026

(54) DEVICE FOR WINDING UP A HOSE

(71) Applicant: SAFE ROLL PTY. LTD., Burnside (AU)

(72) Inventors: Matthew Simmonds, Burnside (AU); Larndis Fehlberg, Beaumont (AU)

(73) Assignee: SAFE ROLL PTY. LTD., Burnside (AU)

(*) Notice: Subject to any disclaimer, the term of this patent is extended or adjusted under 35 U.S.C. 154(b) by 0 days.

(21) Appl. No.: 18/864,543

(22) PCT Filed: Apr. 12, 2023

(86) PCT No.: PCT/AU2023/050299
§ 371 (c)(1),
(2) Date: Nov. 10, 2024

(87) PCT Pub. No.: WO2023/215932
PCT Pub. Date: Nov. 16, 2023

(65) Prior Publication Data

US 2025/0256939 A1 Aug. 14, 2025

(30) Foreign Application Priority Data

May 10, 2022 (AU) ................................ 2022901242
Oct. 27, 2022 (AU) ................................ 2022903195

(51) Int. Cl.
*B65H 54/58* (2006.01)
*A62C 33/04* (2006.01)
*B65H 54/44* (2006.01)

(52) U.S. Cl.
CPC ........... *B65H 54/585* (2013.01); *A62C 33/04* (2013.01); *B65H 54/44* (2013.01); *B65H 2404/16* (2013.01); *B65H 2701/332* (2013.01)

(58) Field of Classification Search
CPC ...... B65H 54/44; B65H 54/58; B65H 54/585; A62C 33/04
See application file for complete search history.

(56) References Cited

U.S. PATENT DOCUMENTS 2,685,419 A * 8/1954 Helberg ............. B65H 75/4497 242/397.1
4,056,241 A * 11/1977 Yates .................. B65H 54/585 242/407

(Continued)

FOREIGN PATENT DOCUMENTS

GB 2550895 12/2017
JP 2009196815 9/2009

(Continued)

OTHER PUBLICATIONS

Rolling winder Rolly III double coiling [Viewed on Internet May 26, 2023] <URL: Rolling winder Rolly III double coiling—YouTube>, Published Jun. 5, 2015.

*Primary Examiner* — Sang K Kim
(74) *Attorney, Agent, or Firm* — Crose Law LLC; Bradley D. Crose

(57) ABSTRACT

A device wherein a flat hose can be rolled up around two arms. The device consists of two U-Shaped rollers that correct the orientation of the hose as it is rolled into the two arms. As the two arms are rotated by the user rotating a crank handle, the hose travels over the two U-shaped rollers and over the drum. The hose is released by the device by laying it on the ground and stepping onto a handle, the hose is released with an orifice in the centre allowing someone to easily carry it.

7 Claims, 24 Drawing Sheets

(56) References Cited

U.S. PATENT DOCUMENTS

| | | | | |
|---|---|---|---|---|
| 5,388,609 A * | 2/1995 | Ghio | A62C 33/04 137/355.27 |
| 8,955,786 B2 * | 2/2015 | Motoji | A62C 33/04 242/391.2 |

FOREIGN PATENT DOCUMENTS

| | | |
|---|---|---|
| JP | 2018162159 | 10/2018 |
| JP | 2020083613 | 6/2020 |

* cited by examiner

DEVICE FOR WINDING UP A HOSE

FIELD OF THE INVENTION

The present invention relates to a device for winding up a hose and has a specific use for a firefighting hose that is called a flat-flat hose.

BACKGROUND TO THE INVENTION

Whilst the description of this application relates to Lay-flat hose is commonly used in an emergency, mining, and agricultural industries it is not intended to limit the invention to the application to lay-flat hoses.

The benefit of a lay-flat hose over other types of hoses is its low requirement for space when it is packed up. Lay-flat hoses are commonly used with firefighting vehicles due to their compact size and flexibility. When the lay-flat hose is ready for use, a fighting crew can simply connect it to a pumping unit and run it out to a location of interest. Once it is ready for use the pump is turned on and water is discharged. When the users have finished using the hose the water is drained from the lay-flat hose, and then two staff are required to roll the lay-flat hose up. One staff member will hold an end, while the other staff member aligns the hose and rolls it up. Depending on the length of lay-flat hose used, the staff member who is aligning and rolling the hose up may walk over 40 m undertaking this task. While rolling the lay-flat hose up the staff member will be hunched over, this is not an ergonomic friendly task.

The issue with rolling up the lay-flat hose is that it is not ergonomic for either staff member and places strain on their back. The hose can weigh up to and over 20 kg when it is damp, therefore it causes safety concerns and adds additional fatigue to the working crew.

Various hand-held devices have been constructed to overcome this issue. These devices work by engaging the hose with a set of forks and rotating those forks either by motive power or manpower until the lay-flat hose is rolled up on the reel.

The issue with this device is that it doesn't provide the user with an easy location for it to be held after the lay-flat hose is wound up, the hose is very tight and is not easy when rolled to move. Another key issue with these devices is the size, they commonly have a set of wheels or a large centrepiece housing an electric motor and batteries.

Reels have also been used to wind up the lay-flat hoses, though an issue with this is that the hose is fixed to the reel and is not easily removed. The reels also take up a substantial amount of space which is not ideal for a fire truck where space is limited.

This patent offers a solution, amongst others, for users to roll a lay-flat hose with an ergonomic location that allow users to easily grip the hose for handling. The device is also compact and can be stored easily.

SUMMARY OF THE INVENTION

In a first aspect the invention there is proposed device to wind up a hose comprising of an elongated shaft, a drivable drum extending adjacent the bottom of the shaft laterally to the shaft, a drive mechanism adapted to rotatable drive the drum, a roller located above the drum and supported by the shaft so as to feed the hose onto the drum, wherein the hose is fed over the roller and then engages the drum wherein the drive mechanism when operated winds the hose onto the drum.

Preferably the roller comprises of a lower roller and two side rollers on either side of the lower roller.

Preferably the side rollers are upward facing.

Preferably the drive mechanism is rotated by a crank handle that transfers power through a shaft to the drivable drum.

Preferably comprising an extendable shaft.

In one embodiment of the invention the device consists of a dividing device on the top roller allowing the device to roll a hose in 'double Dutch' style.

In another embodiment of the invention, the dividing device is on the bottom roller.

In another embodiment of the invention, a roller is located on the release arm reducing friction by rolling along the edge of the coiled hose and not allowing the hose to contact the main body of the device.

It should be noted that any one of the aspects mentioned above may include any of the features of any of the other aspects mentioned above and may include any of the features of any of the embodiments described below as appropriate.

The object of this invention is to provide a system and method to address the above shortcomings or at least provides the public with a useful alternative.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF THE INVENTION

Figure 1:
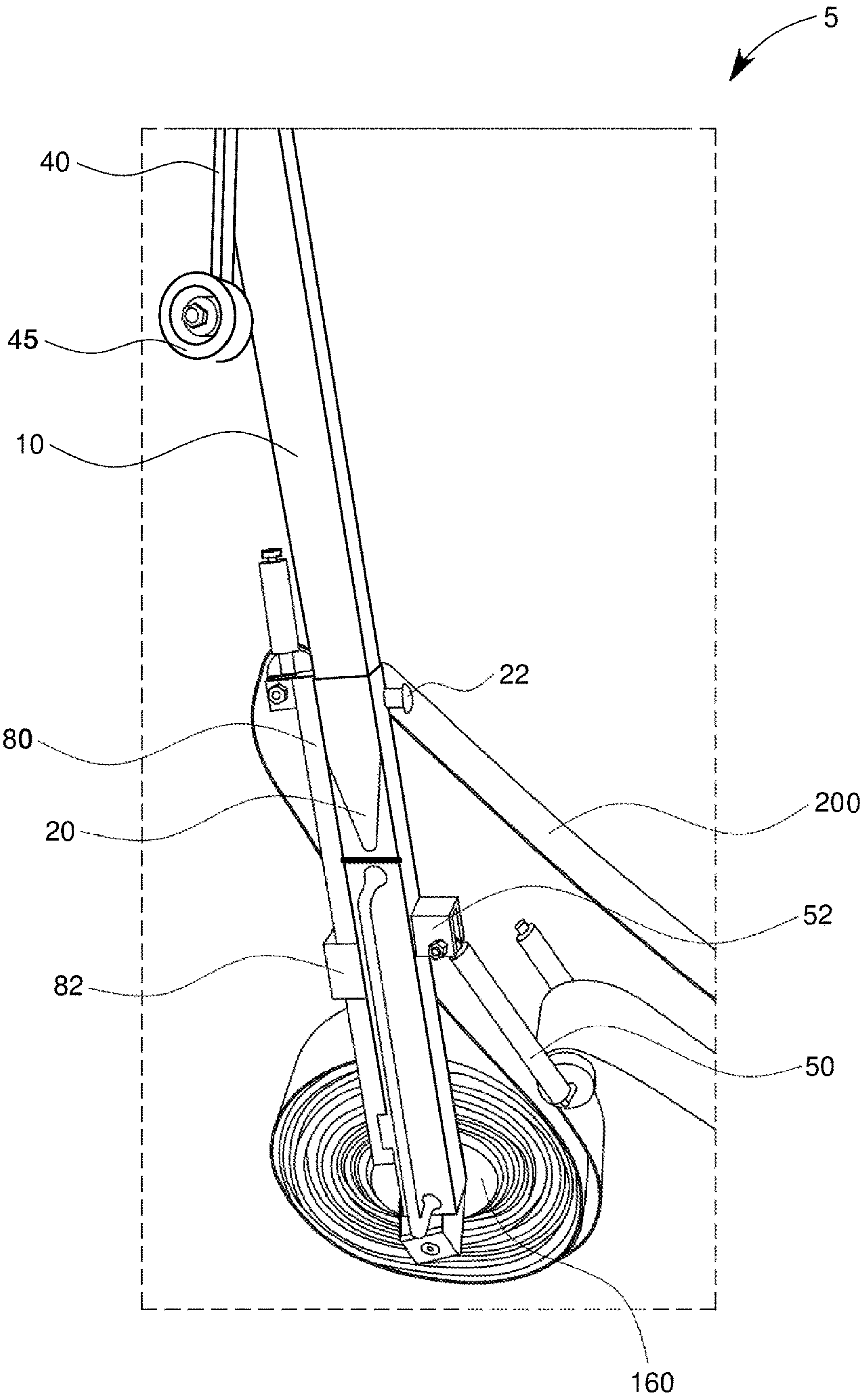
FIG. 1 is a side view of an embodiment of the present invention illustrating a device to roll up a hose.

Referring now to the Figures in detail the lay-flat hose reel device 5 consists of a lower tube 10, upper tube 20, crank 40, and a drum 180.

The device 5 consists of an upper tube 10. The upper tube 10 is square in shape, though it is not limited to this shape and can be but is not limited to a rectangle, triangle, or hexagonal. The upper tube 10 is hollow.

The material of the upper tube 10 can be but is not limited to aluminium, steel, carbon fibre, or fibreglass or a combination thereof.

At the top of the upper tube 10 there is a top handle 30. The top handle 30 is a shaft that protrudes outwards from the upper tube 10. The shape of the top handle 30 can be but is not limited to a shaft or an ergonomic handle. The top handle 30 is attached to the upper tube 10 by welding it in place, it can also be fastened wherein the handle is threaded into a threaded hole on the upper tube 10. A crank 40 is located at the top of the upper tube 10. The crank 40 is connected to a crankshaft 110 in the top crankshaft housing 105. Connected to the crank 40 is a crank handle 45. The crank handle 45 is circular in shape though other forms of handles can be used such as a bar or ergonomic grip. The crank handle 45 is connected to the crank 40 with a fastener, the fastener enabling the crank handle 45 to rotate.

The upper tube 10 internally engages the hollow lower tube 20. The upper tube 10 can slide up and down inside the lower tube 20. The upper tube 10 is fixed into place with the lower tube 20 with a locking pin 22 which is located on the outer surface of the lower tube 20. The locking pin 22 is a spring-loaded pin that is fixed to the outer tube 20 at the top, an example illustrated in FIG. 2.

When the locking pin 22 is pulled outward from the lower tube 20, the pin 22 disengages the upper tube 10, enabling the upper tube 10 to slide up and down inside the lower tube 20. Once the upper tube 10 is in the desired position that is fully extended, the locking pin 22 can be released by the user. As the locking pin 25 is released it locks into a collated hole (not shown) in the upper tube 10.

The lower tube 20 includes a handle 25 wherein the user can hold the device 5. The handle 25 is typically a thin bar that protrudes out from the lower tube 20 to allow the user's hand to be inserted into and grip the bar. An example of the handle can be observed in FIG. 9.

Connected in front of the lower tube 20 is a swing arm 50. The swingarm 50 is connected to a swing arm mount 52. The swingarm mount 52 is generally of a U-shaped configuration and has three sides that are fixed to the outer surface of the lower tube 20. The three sides of the mount 52 protrude outwards between 20 to 40 mm. The mount 52 has an opening as shown in FIG. 1, wherein the swing arm 50 is mounted. The swingarm 50 is mounted to the swing arm mount 52 with a fastener 58. The swingarm 50 and the swing arm mount 52 have collocated holes 54, 56 that allow the fastener 58 to pass through.

Figure 10:
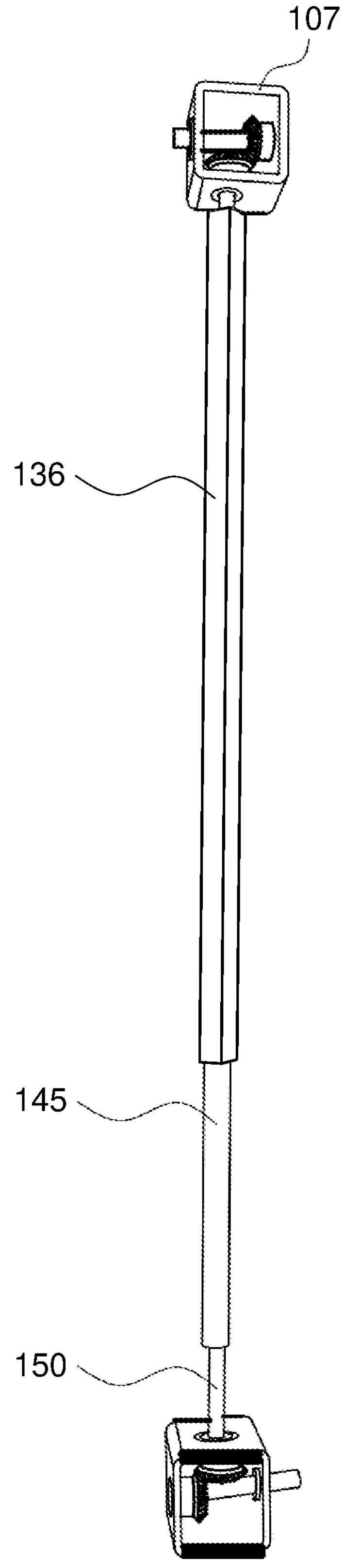
FIG. 10 is a partial internal view of the device.
Figure 11:
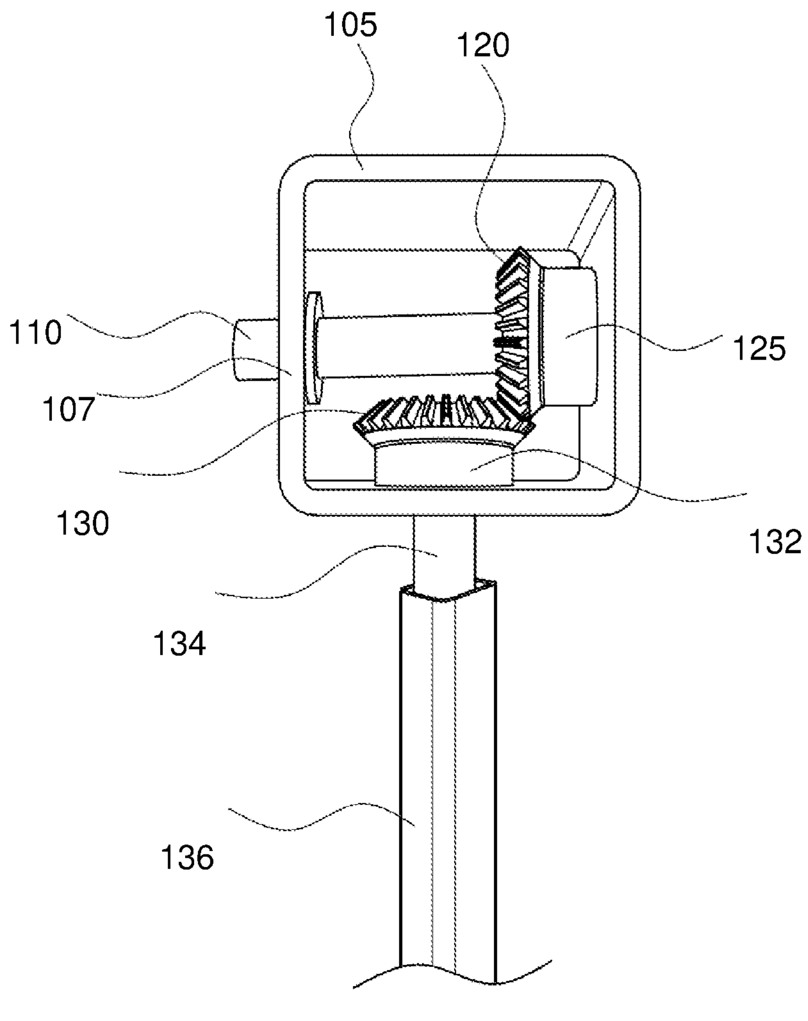
FIG. 11 is a close-up view of the top crank.

The fastener 58 is also fed through a helical spring 62, wherein one end of the spring 62 is fitted over the swing arm 50 and the other end is abutted against the surface of the lower tube 20. As the swingarm 50 is extended outwards from the lower tube 20, the spring 62 increase in tension. As shown in FIG. 1, this applies constant pressure onto the hose 200 as it is being wound up around the drum 160. The swingarm 50 pushes the hose 200 into the drum 160. The swingarm 50 is a bar with a U-shape. Rollers 64, 65, 66 are placed over the swingarm bar 50 bars on all three sides as shown in FIG. 10. Two rollers 64, 65 are located on the sides while one roller 66 is located on the bottom. The distance between the side rollers 64, 65 are adjustable and can range from 5 cm to 1 meter in width. This can be adjusted either by but not limited to sliding the two arms apart from each other with a telescopic bar, or by detaching the swingarm 50 and fitting a wider one.

The rollers 64, 65, 66 can rotate on the swing arm 50. The rollers 64, 65, 66 can be but are not limited to bearing or bushings mounts. A fastener 68 is used to retain the rollers 64, 65, 66 on the swingarm 50.

Figure 9:
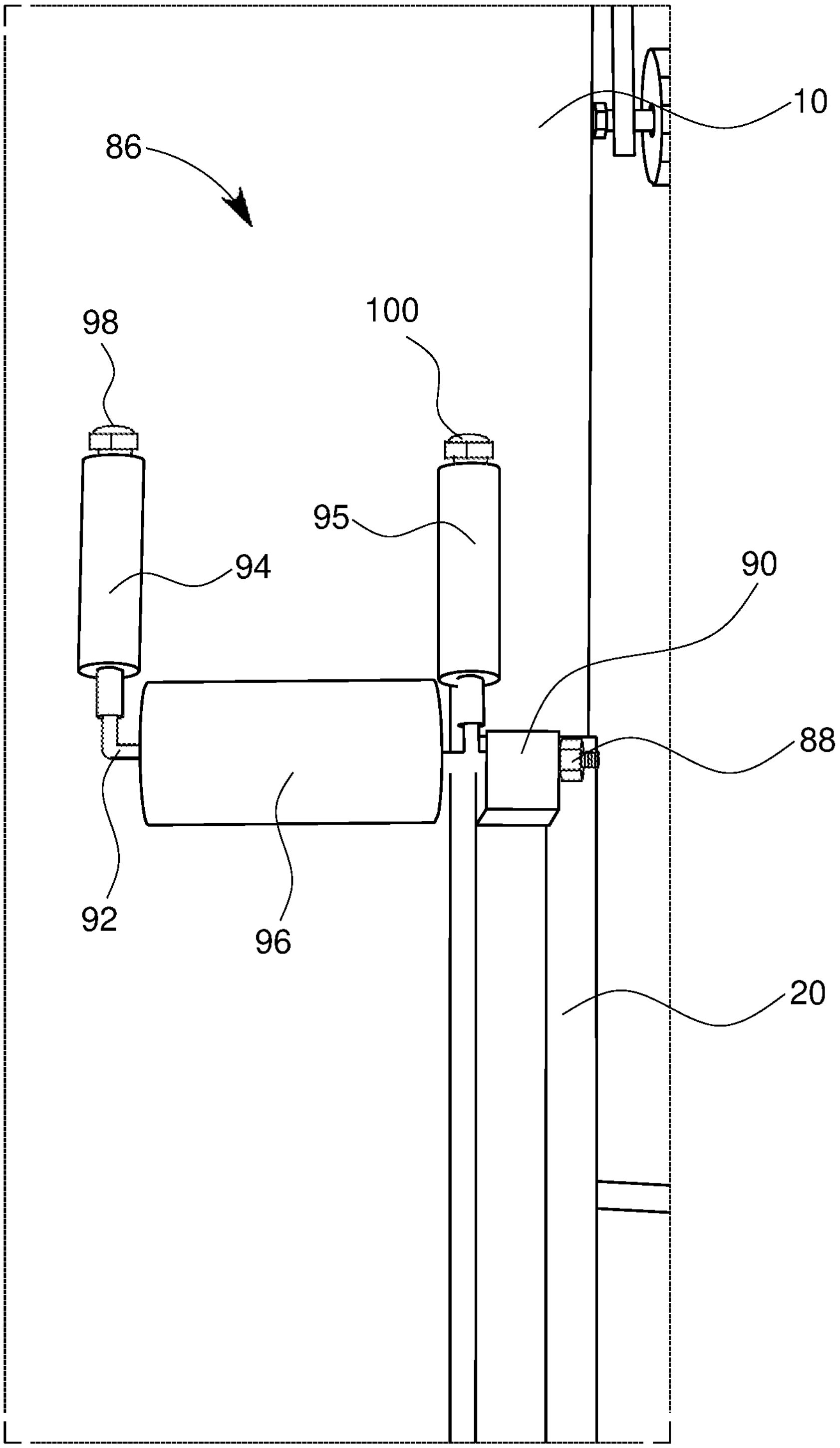
FIG. 9 is a close-up view of the release arm of the device.

On the opposite side of the lower tube 20 to the swingarm 50 is a release arm 80. The release arm 80 is attached to the lower tube 20 by a mount 82. The mount 82 is a L-bracket that protrudes outwards. The mount 82 is fixed to the lower tube 20 by welding it to the surface. The release arm 80 is connected to the mount 82 by a pin 84 with a mechanical bias. The mechanical bias used can be but is not limited to a spring, or gas strut. The mechanical bias retains the release arm 80 in the same orientation as shown in FIG. 9, as the release arm pivots on the pin 84, it will apply pressure to the mechanical bias to return it back to its original position as shown in FIG. 9.

The release arm 80 is connected to the mount 82 in the centre of the release arm 80, though the location of the connection between the release arm 80 and the mount 82 is not limited to this location and can be positioned anywhere the user may require.

The release arm 80 can swing in the mount 82, though it is limited to the range it can swing since the release arm 80 will foul on the release arm mount 82 past a certain angle. At the top of the release arm 80, a release arm top roller 86 is located. The release arm top roller 86 is attached to a mount 90 at the top of the release arm 80. The release arm top roller 86 is fastened 88 to the mount 90. A nut is placed over the fastener 88 to retain the release arm top roller 86 in the mount 90.

The release arm top roller 86 is formed of a U-shaped bar 92 with two arms that extend towards the top handle 30 and the same direction as the swing arm 50. An example can be observed in FIG. 9.

The width of the release arm 80 is adjustable, the width of the release arm can be but is not limited to between 10 cm to 100 cm. It can be adjusted by replacing the release arm 80 with a wider one or the release arm 80 can have a telescopic bar allowing the width to be expanded.

On each of the arms of the of the bar 92 rollers 94, 95 are located. The rollers 94, 95 slide over each of the arms of the bar 92, a fastener 98, 100 is used to retain the rollers 94, 95 in place. A larger roller 96 is found at the bottom of the U-shape bend of the release arm top bar 92. The rollers 94, 95, 96 can be but are not limited to a bearing or bushing mount that allow it to spin freely.

At the top of the upper tube 10 the crank handle 40 is connected to the crankshaft 110. The crankshaft 110 protrudes out of the top crank housing 105 hole 107. The crankshaft 100 mounted to the crank 40 with a fastener. The crankshaft 110 is connected to a crank gear 120, which is mounted to a crank bearing 125. The crank gear 120 is connected to the main crank gear 130. The main crank gear

130 and crank gear 120 have a gear ratio of 1:1. The main crank gear 130 is seated in a main crank gear bearing 132. The main crank gear bearing 132 is fixed to the bottom of the top crank housing 105. The main crank gear 130 is connected to the main shaft 134 wherein when the main crank gear 130 is rotated the main shaft 134 will also rotate.

The main shaft 134 is a shaft that is inserted into the centre void of the upper 10 and lower tube 20. The main shaft 134 can be any shape or profile in particular but is not limited to a square, tube, hex, triangular, octagonal, and fluted. The secondary shaft extension 145 matches the same profile of the main shaft 134. Both shafts 134, 145 need to have complimenting profiles that allow them to interlock with each other but are capable to slide up and down.

Figure 12:
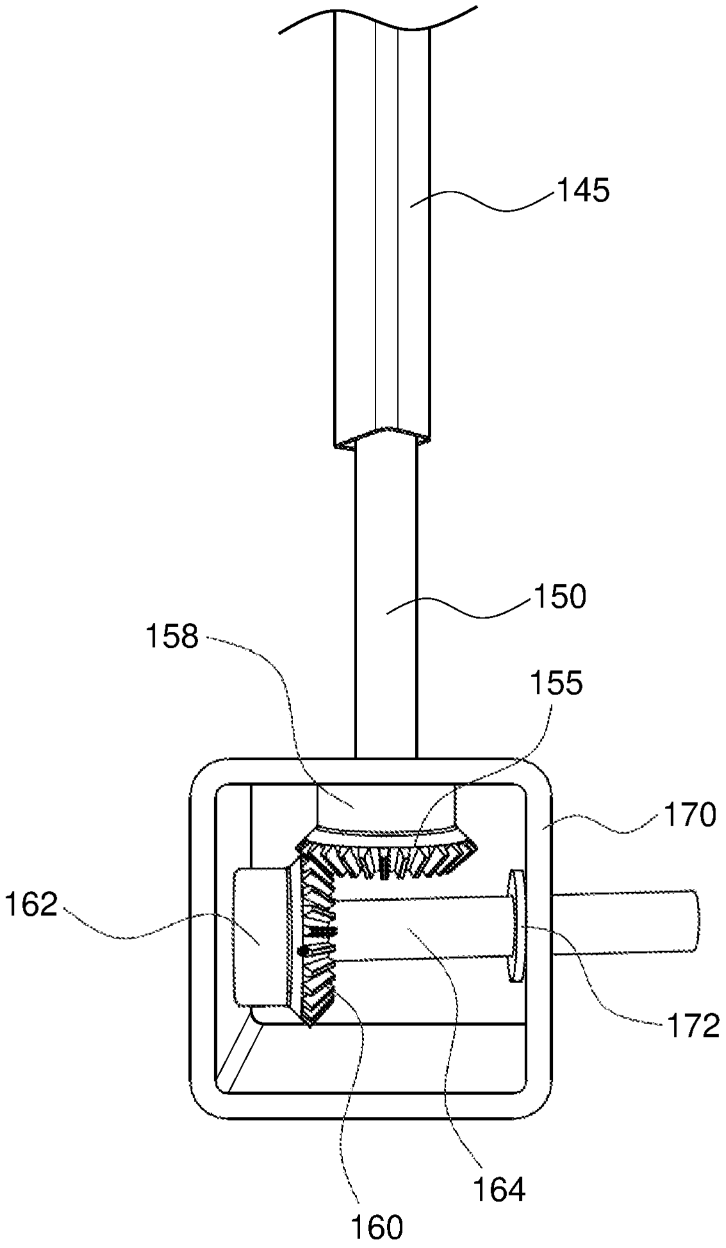
FIG. 12 is a close-up view of the drum gears.
Figure 13:
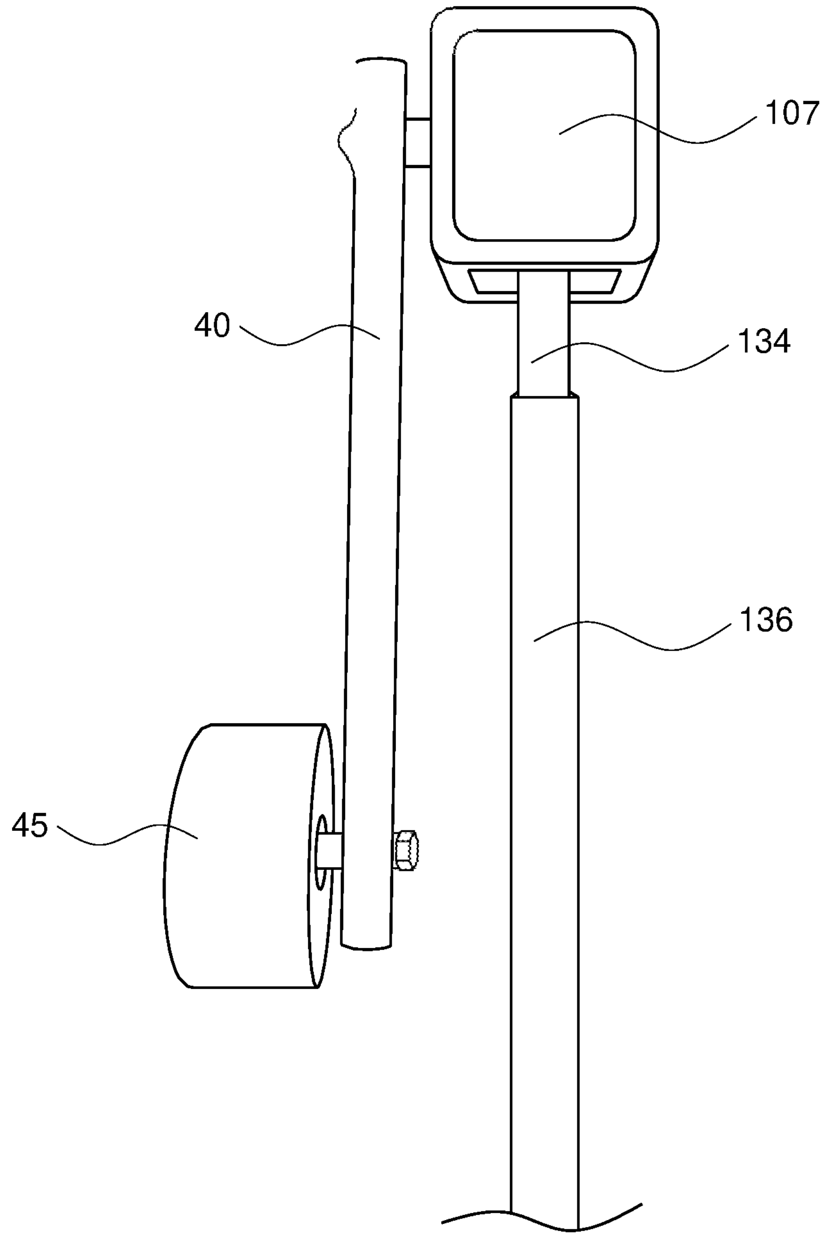
FIG. 13 is a view of the top crank handle and shaft.
Figure 14:
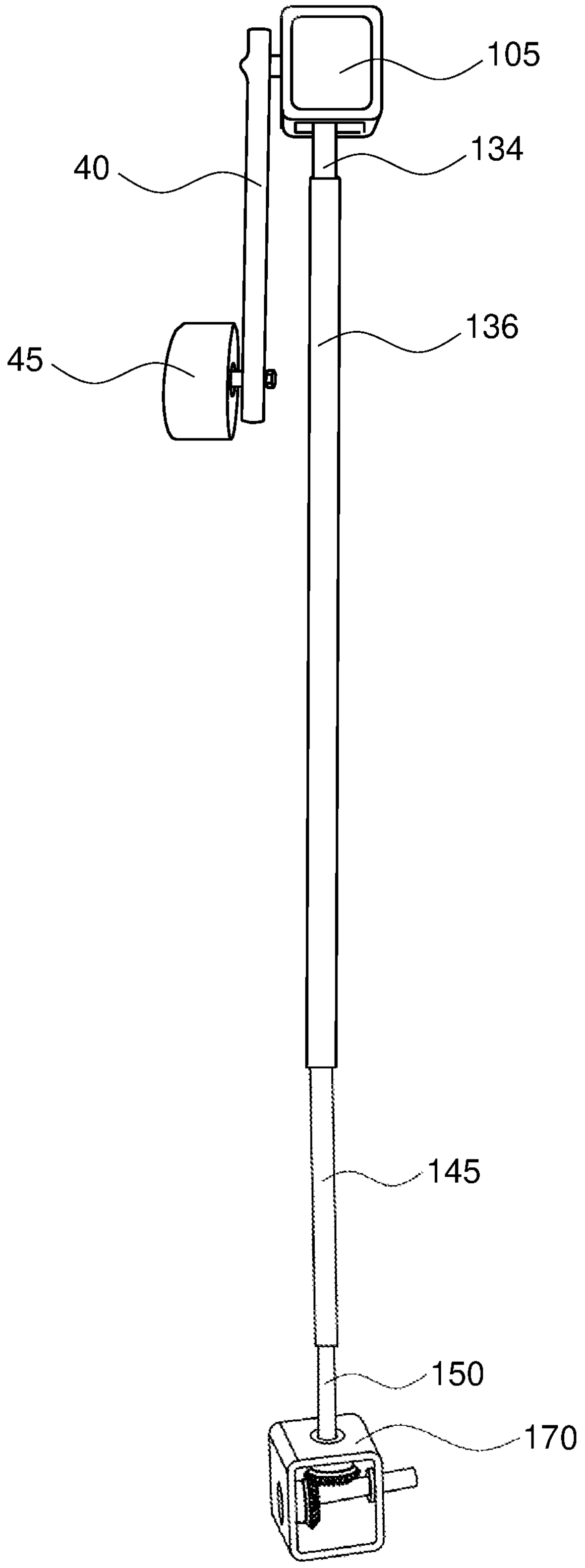
FIG. 14 is a view of the internals.
Figure 15:
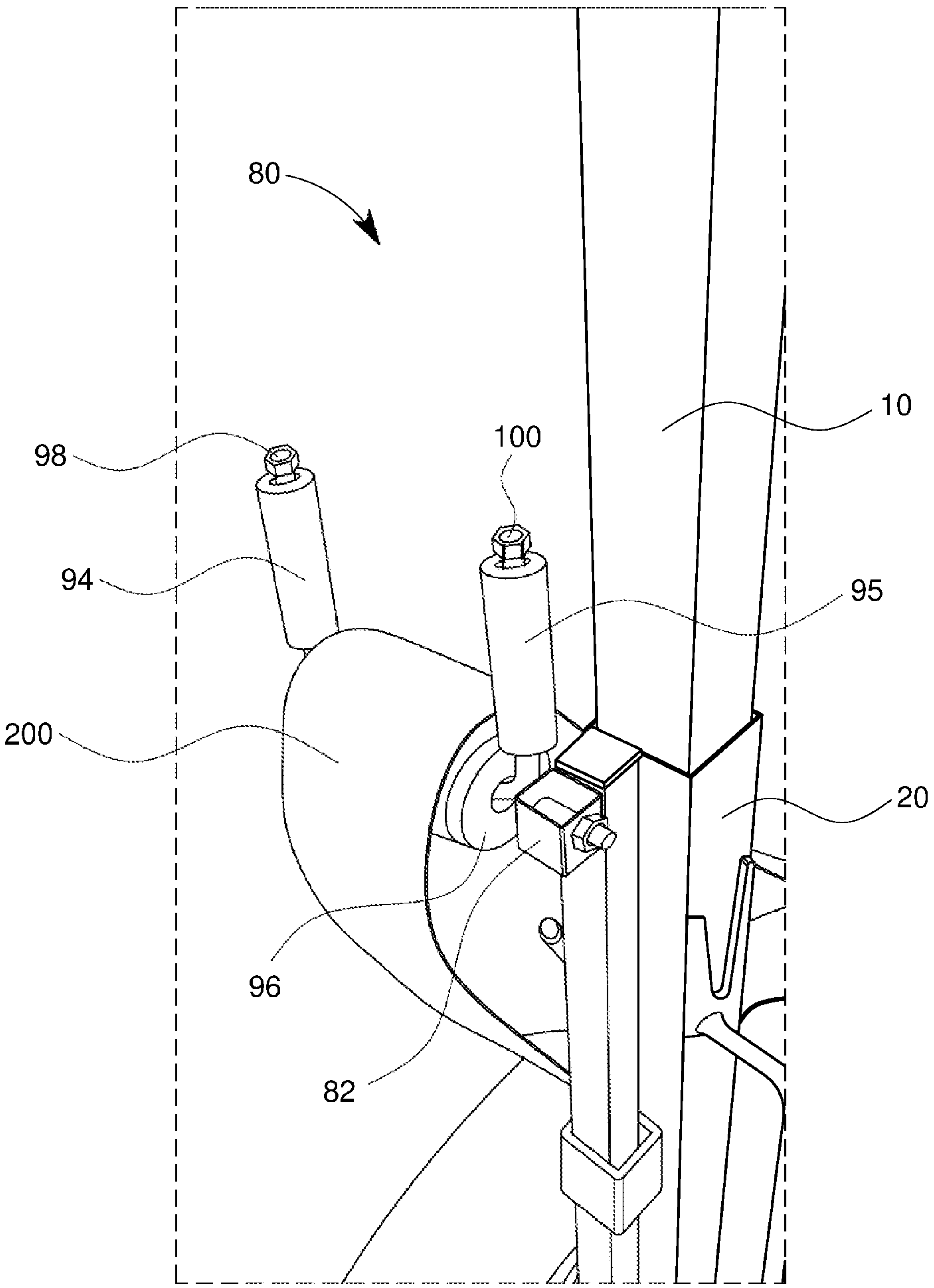
FIG. 15 is a view of the top roller
Figure 16:
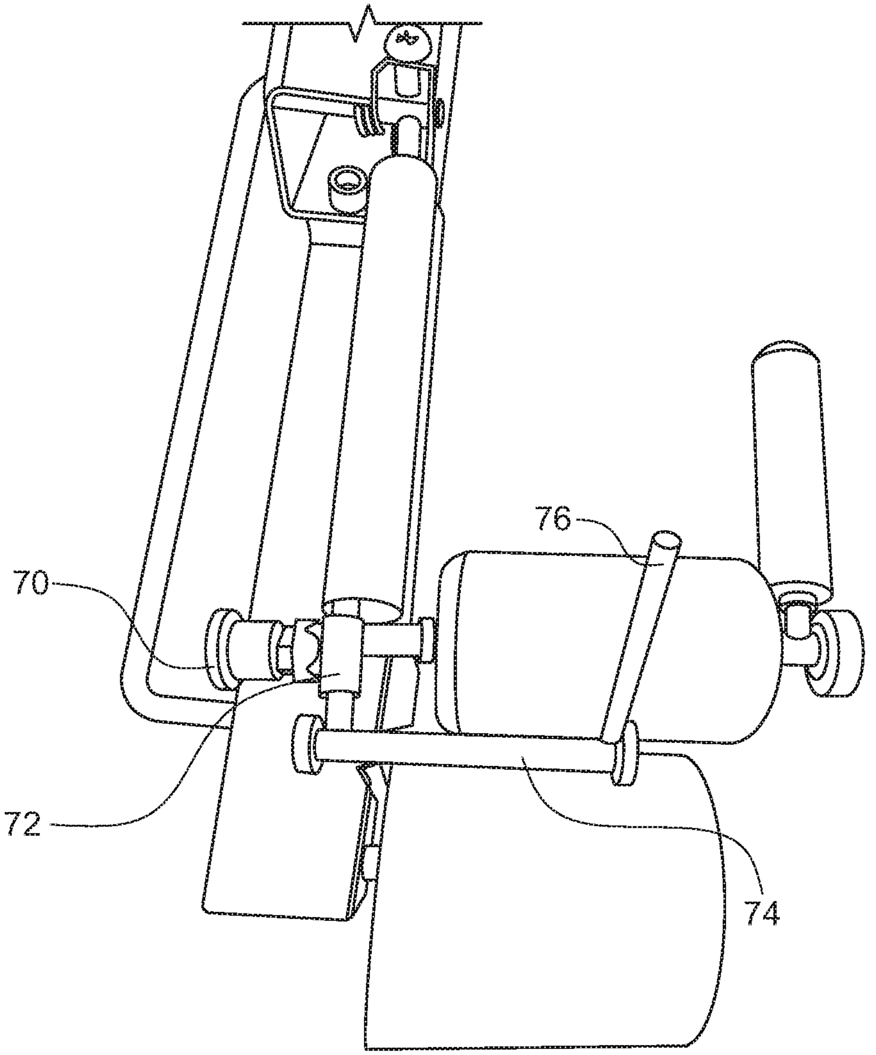
FIG. 16 is a view of an embodiment with divider on the bottom roller and additional roller on release arm.
Figure 17:
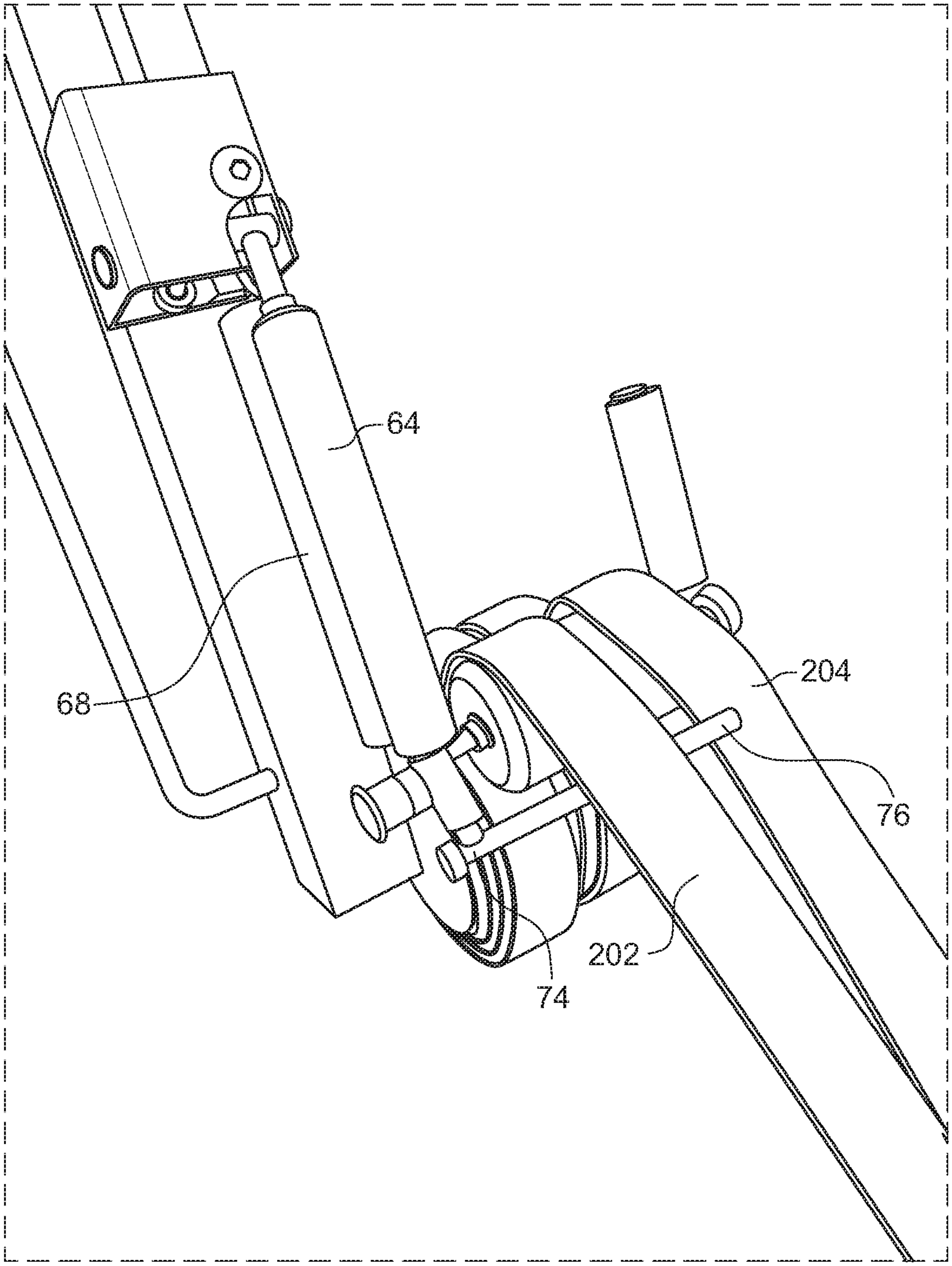
FIG. 17 is a perspective view of a hose being rolled double Dutch style.
Figure 18:
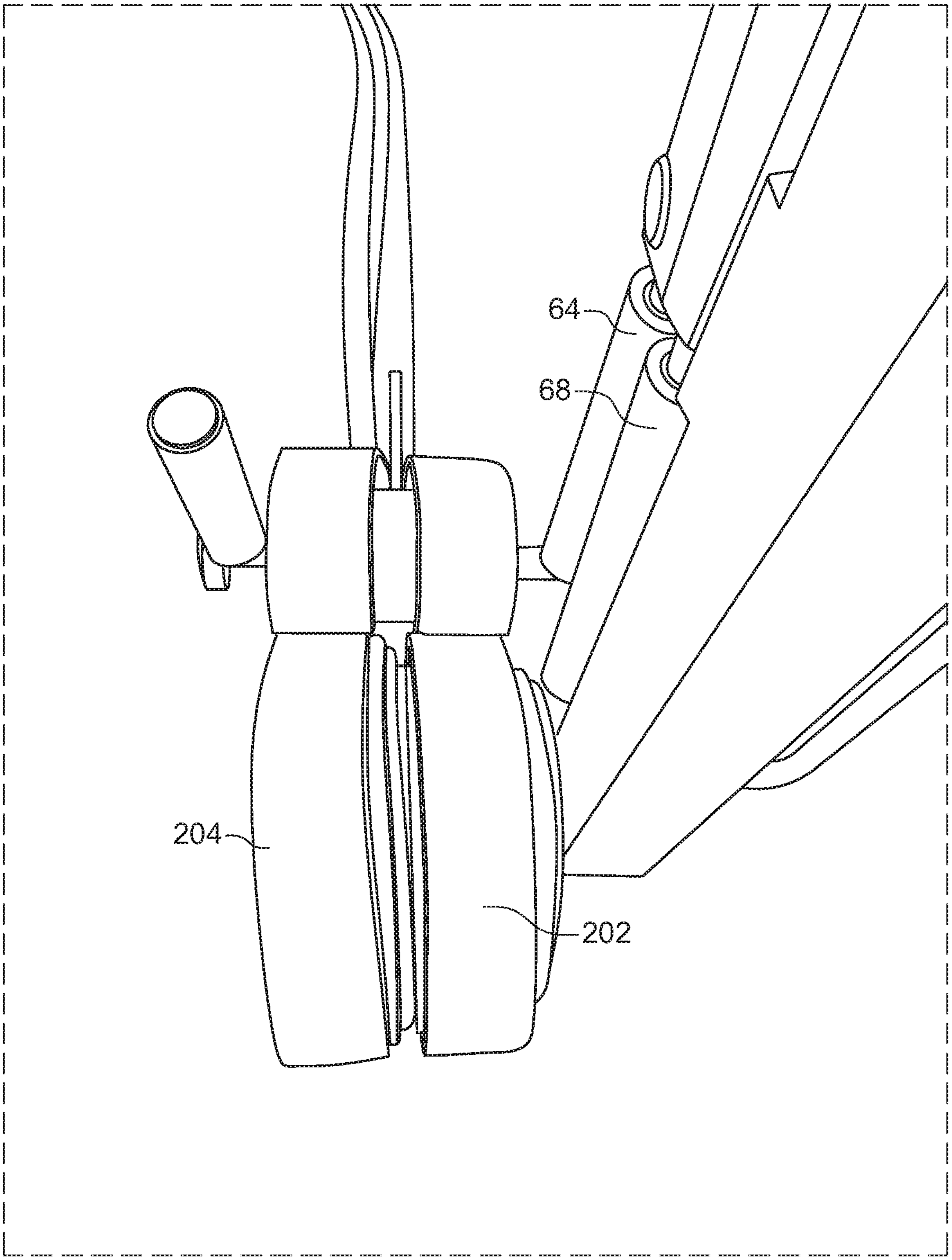
FIG. 18 is a front view of a hose being rolled double Dutch style.
Figure 19:
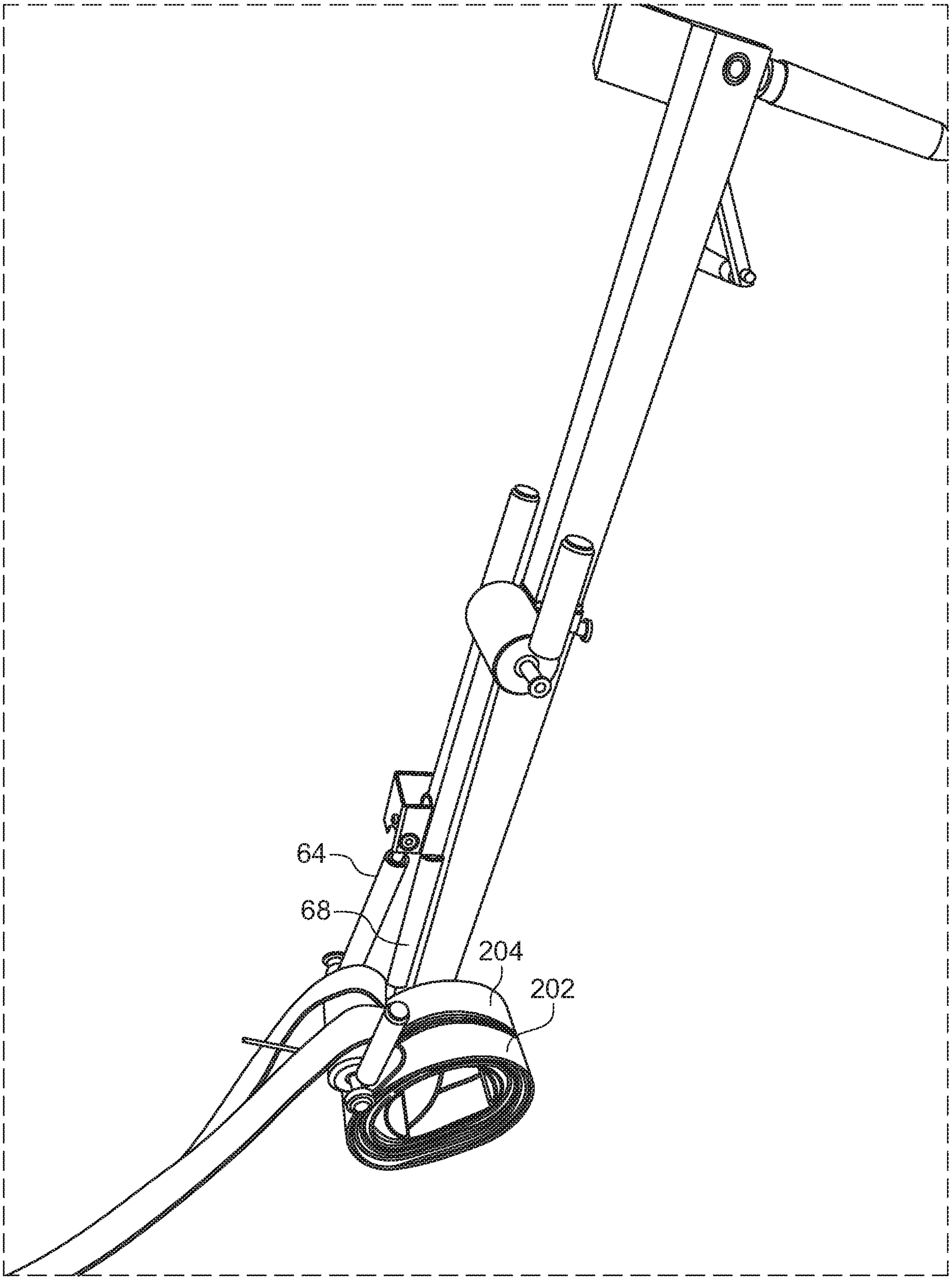
FIG. 19 is a side view of a hose being rolled double Dutch style.
Figure 20:
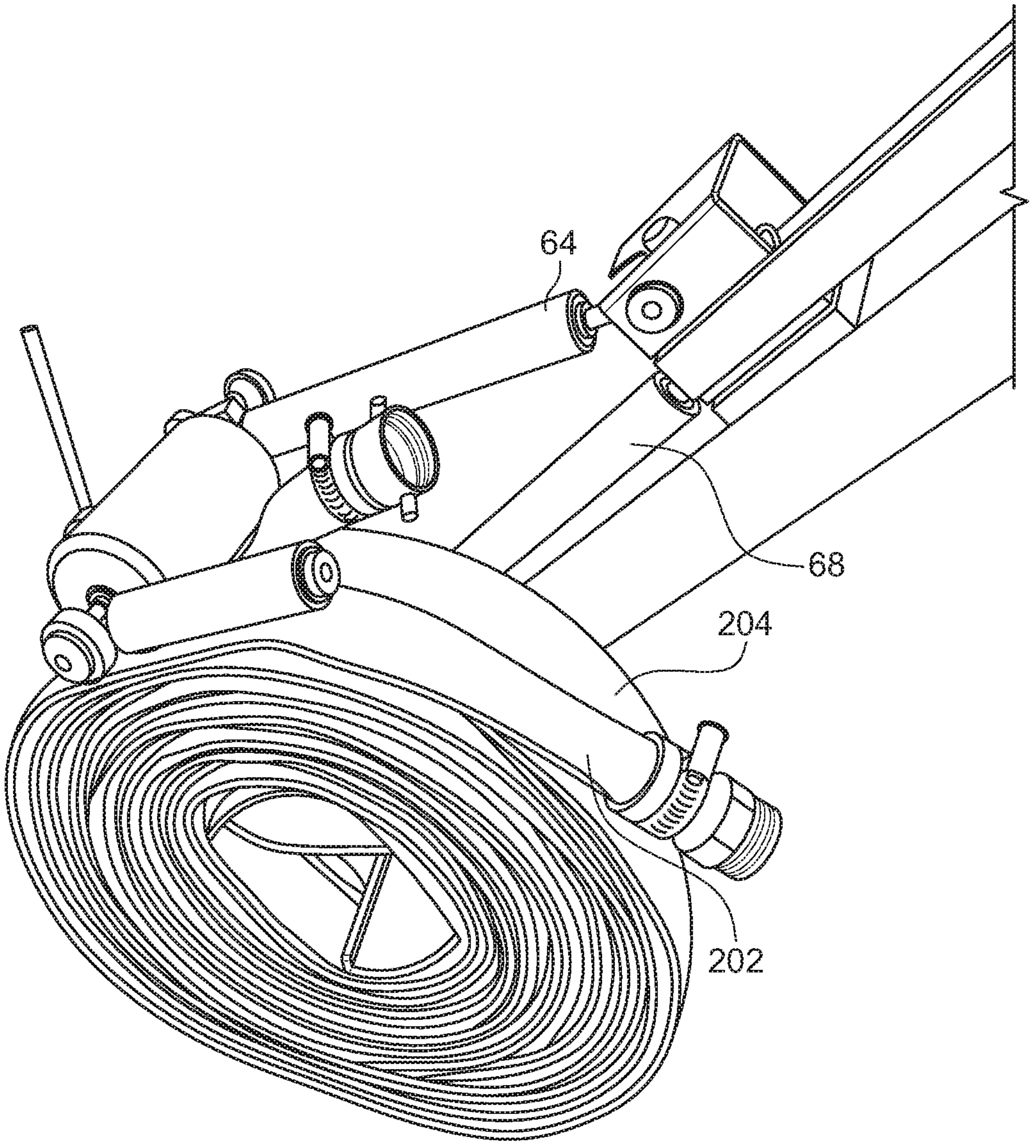
FIG. 20 is a perspective view of a hose fully rolled in double Dutch style.

A secondary shaft extension 145 is inserted into the void in the main shaft 134, an example can be observed in FIG. 12. The secondary shaft extension 145 can slide up and down inside the centre of the main shaft 134. The secondary shaft extension 145 is connected to a secondary shaft 150. The secondary shaft 150 enters into the drum gear housing 170 wherein it is connected to the lower shaft gear 155. The lower shaft gear 155 is mounted in place by the lower shaft gear bearing 158. The lower shaft gear bearing 158 is fixed to the drum gear housing 170. The lower shaft gear 155 is connected to the drum gear 160. The lower shaft 155 and the drum gear 160 have a gear ratio of 1:1.

The drum gear 160 is connected to a drum gear shaft 164. The drum gear shaft 164 is held in position inside the drum gear housing 170 by drum gear bearing 162. The drum gear bearing 162 is fixed to the drum gear housing 170 inner wall. The drum gear shaft 164 extends out of the drum gear housing 170 through a hole 172 on the side of the drum gear housing 170. The drum gear housing 170 is fixed to the lower tube 20 at the bottom as shown in FIG. 10. The drum crankshaft 164 is connected to the drum 180 by the drum gear shaft 164 being connected to the drum rear plate 185.

The drum rear plate 185 shape can be but is not limited to a circle, square, oval, or rectangle.

The diameter of the rear drum plate 185 can be but is not limited to 2 cm to 600 cm.

The rear drum plate 185 can also be adjustable wherein the arms 190, 192 can be adjustable and the diameter they are positioned on the rear drum plate 185 is adjustable. This can be undertaken by switch the drum 180 with a different size or using a drum 180 with arms that can be shifted to change the diameter. The drum rear plate 185 has two semi-circular arms 190, 192 that protrude outwards from the drum rear plate 185.

The number of arms 190, 192 on the drum rear plate 185 can be but is not limited to 1 to 20 arms. The number of arms 190, 192 are based on what the user will require.

The two semi-circular arms 190, 192 are opposite each other on the drum rear plate 185. The position of the arms 190, 192 are not limited to these positions and can be placed anywhere on the place in accordance to the users' requirements. The shape of the arms 190, 192 can be but is not limited to semi-circles, circular tubes, a flat panel, a circle with a single slot opening, and a square.

The edge is rounded on each of the arms 190, 192. This can be undertaken by but is not limited to fixing a bar 194 to each of the arms' 190, 192 edges or folding the edges. Rounding the edge of the arms 190, 192 allows the hose 200 to be easily removed when required.

As the crank arm 40 is rotated, the crank gear 120, main crank gear 130, main shaft 134, secondary shaft extension 145, secondary shaft 150, lower shaft gear 155, drum gear 160, and the drum 180 are rotated at the same time. The device 5 can be rotated clockwise and anti-clockwise.

The hose 200 that is preferably used for within this invention is a flat hose. A flat hose is commonly a hose that can fold flat, this is achieved by the hose being made of a woven water resistant material or PVC.

In a second embodiment of the invention there is a flange 72 with flange screw for tightening or loosening. Flange 72 is attached to swing arm 50. Extending from the flange 72 is flange arm 74, with dividing pole 76 at the end of the flange arm. Dividing pole 76 allows the hose to be rolled into two adjacent rolls 202, 204 in a "double Dutch" roll.

A "double Dutch" rolled hose is also known in the art as a "double donut", or "twin donut" rolled hose.

Figure 21:
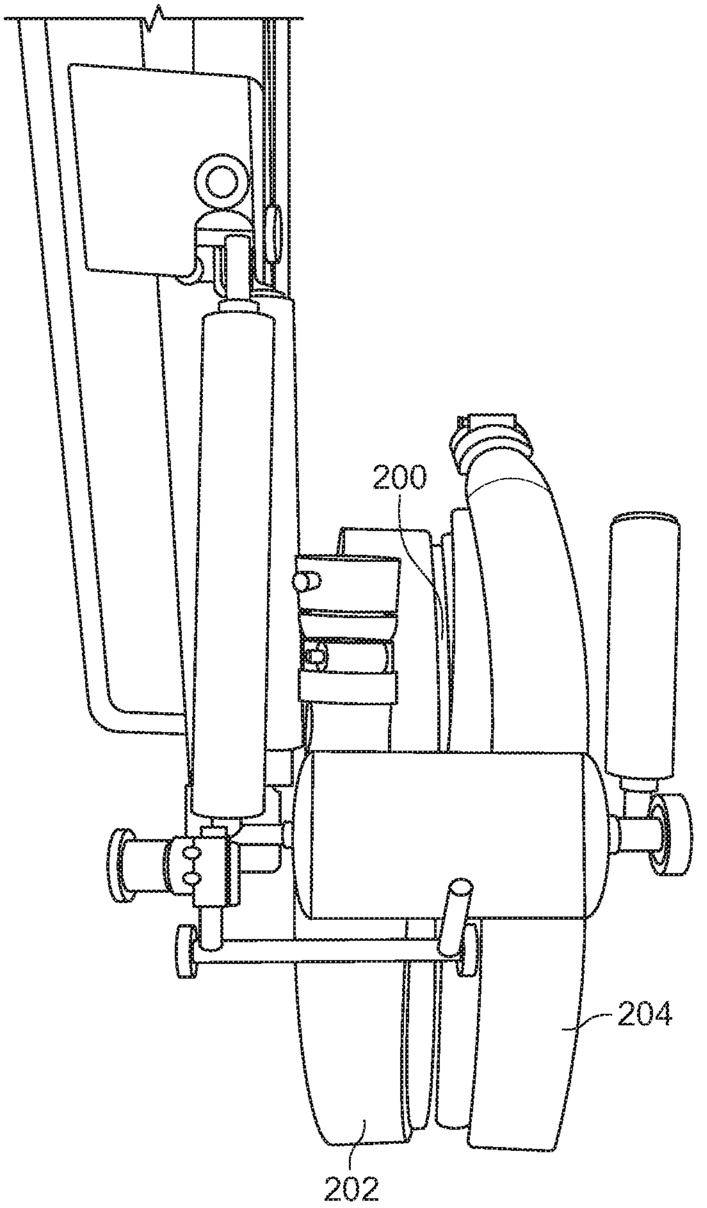
FIG. 21 is front view of a hose fully rolled in double Dutch style.

Referring to FIG. 21, "double Dutch" rolled hose 200 is rolled into two adjacent rolls 202, 204. This method of rolling a fire hose is commonly used for grass fire fighting hoses.

Example 1

The device 5 is capable to roll up a flat hose 200. The hose diameter can be between 4-300 mm in edge-to-edge width.

Firstly, the device 5 is in its compact state, wherein the upper tube 10 is pushed into the lower tube 20. The user then pulls the spring-loaded pin 22 out allowing the inner tube 10 to be extended out of the lower tube 20 until the device 5 is at its operational state as shown in FIG. 9.

The user firstly lays the hose 200 on the ground. The hose 200 can be either folded on itself or laid down flat as a single layer.

Figure 2:
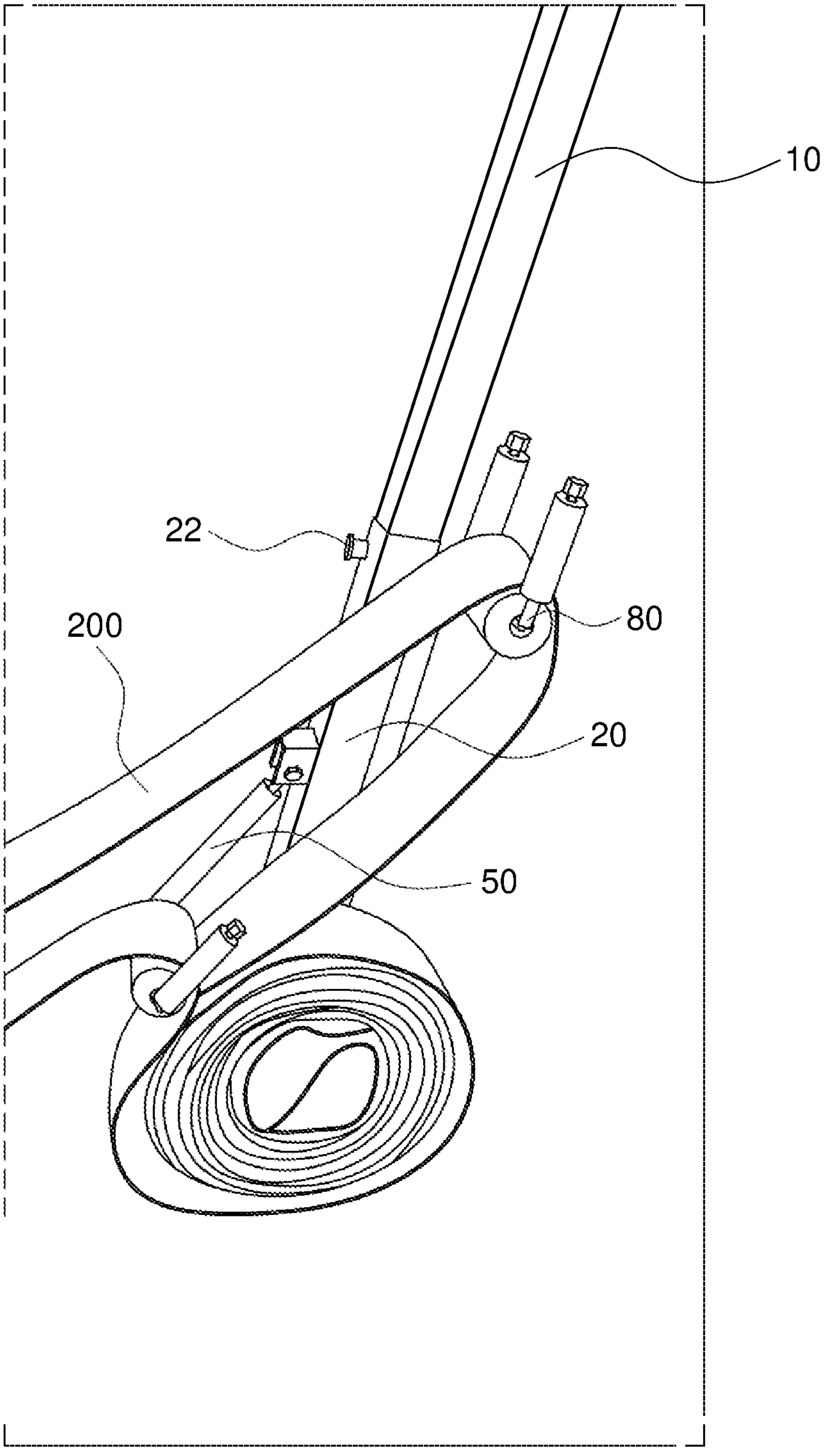
FIG. 2 is a side view of the device displaying a partially rolled up hose.
Figure 3:
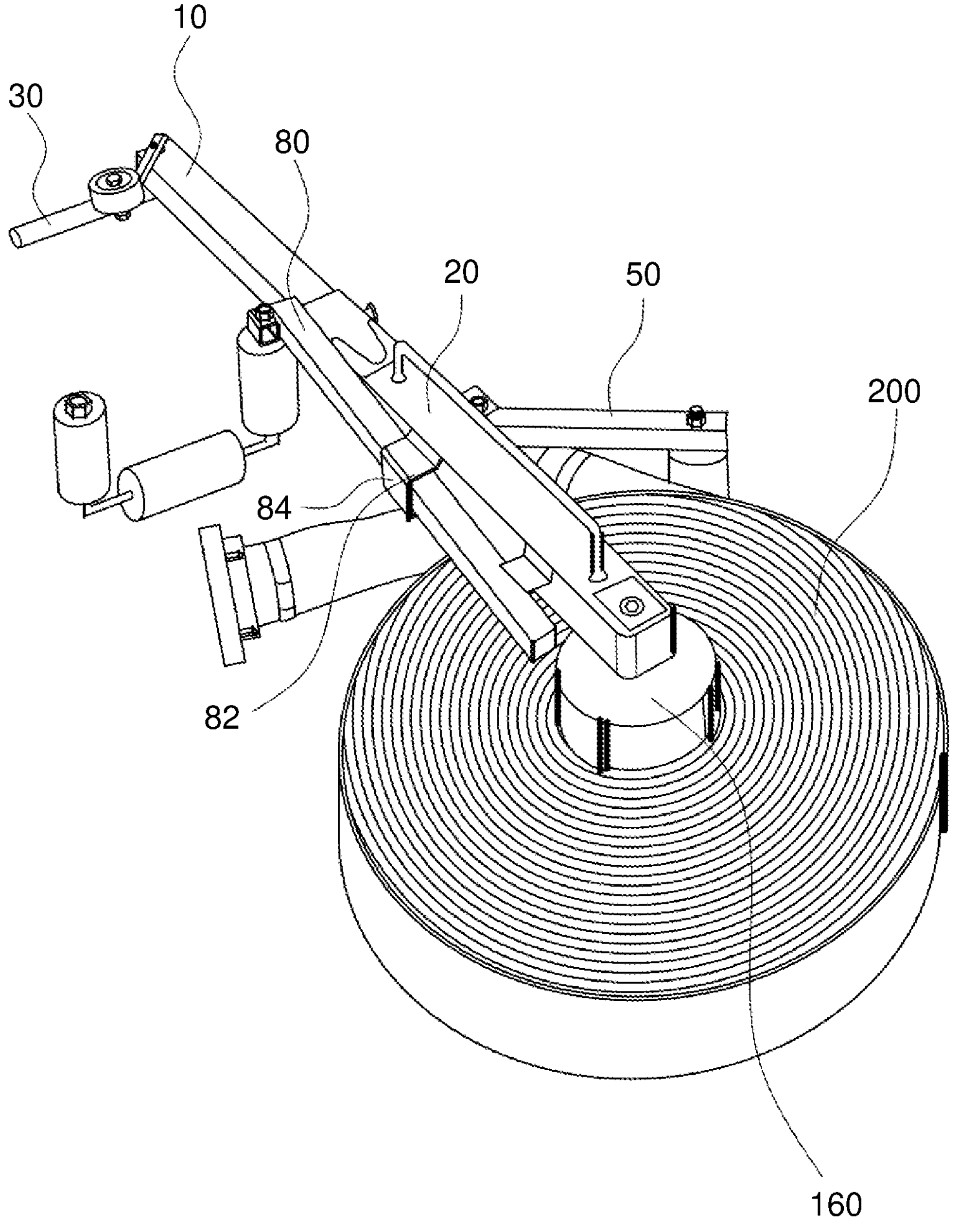
FIG. 3 displays the device laid down with a flat hose completely rolled up.
Figure 4:
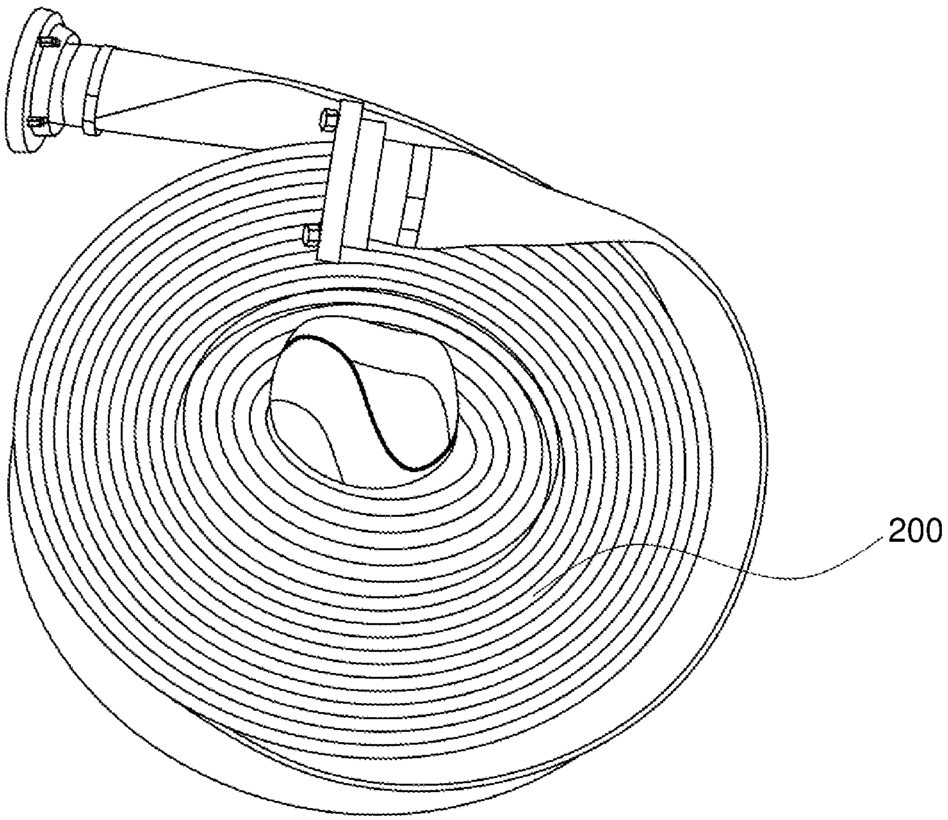
FIG. 4 is the rolled-up flat hose of FIG. 1.

The folded end of the hose 200 is wrapped around the two arms 190, 192 on the drum 180 in an S-shape as shown in FIG. 2.

The lower length of the hose 200 is wrapped over the swing arm 50, and the other length of the hose 200 is pulled over the release arm 80 as shown in FIG. 2.

The user then rotates the crank 40 while walking towards the end of the hose 200. As the user is rotating the crank 40 and walking towards the end of the hose 200, the hose 200 will continue to roll up around the drum 180. An example of a partially rolled up hose 200 on the drum can be observed in FIG. 2. The swingarm 50 is constantly applying pressure on the hose 200 due to the spring 62. This keeps the hose 200 tight against the drum 180 and ensures the hose 200 is not loose.

Figure 7:
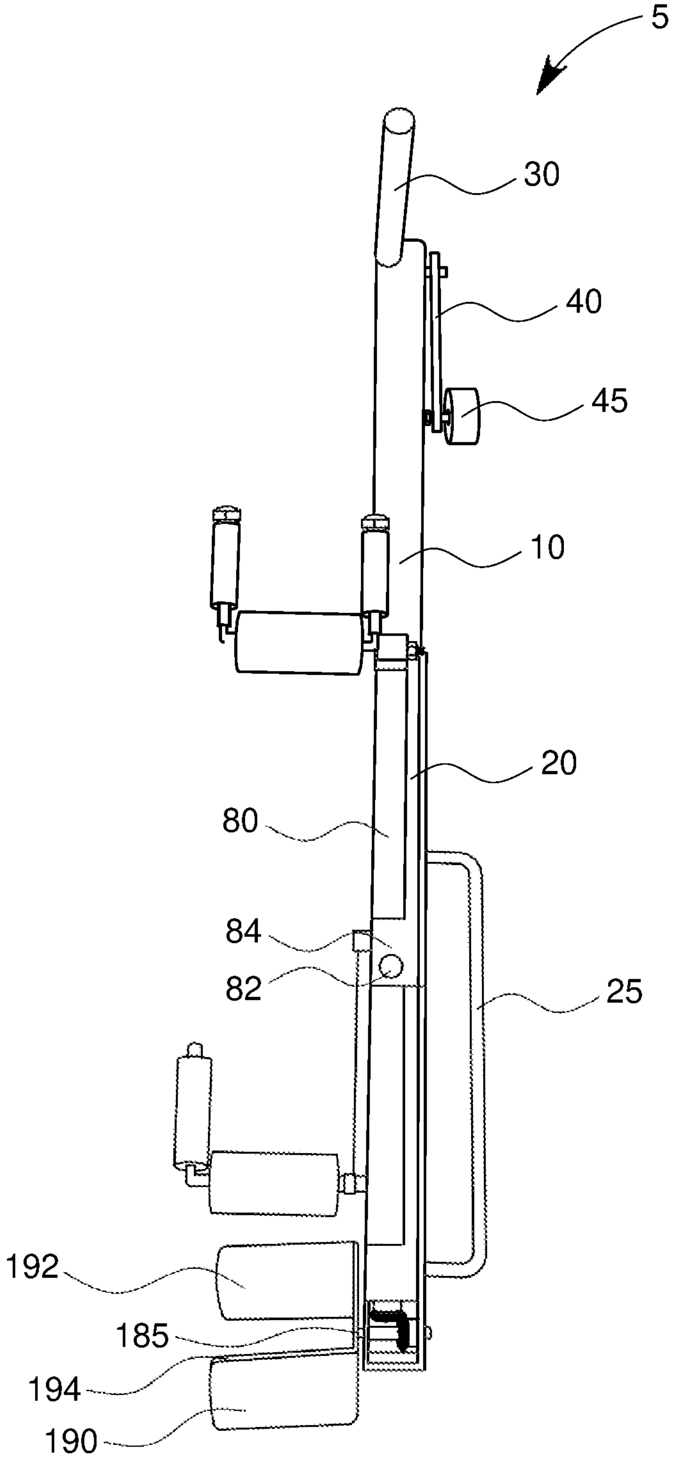
FIG. 7 is a rear view of the device.
Figure 8:
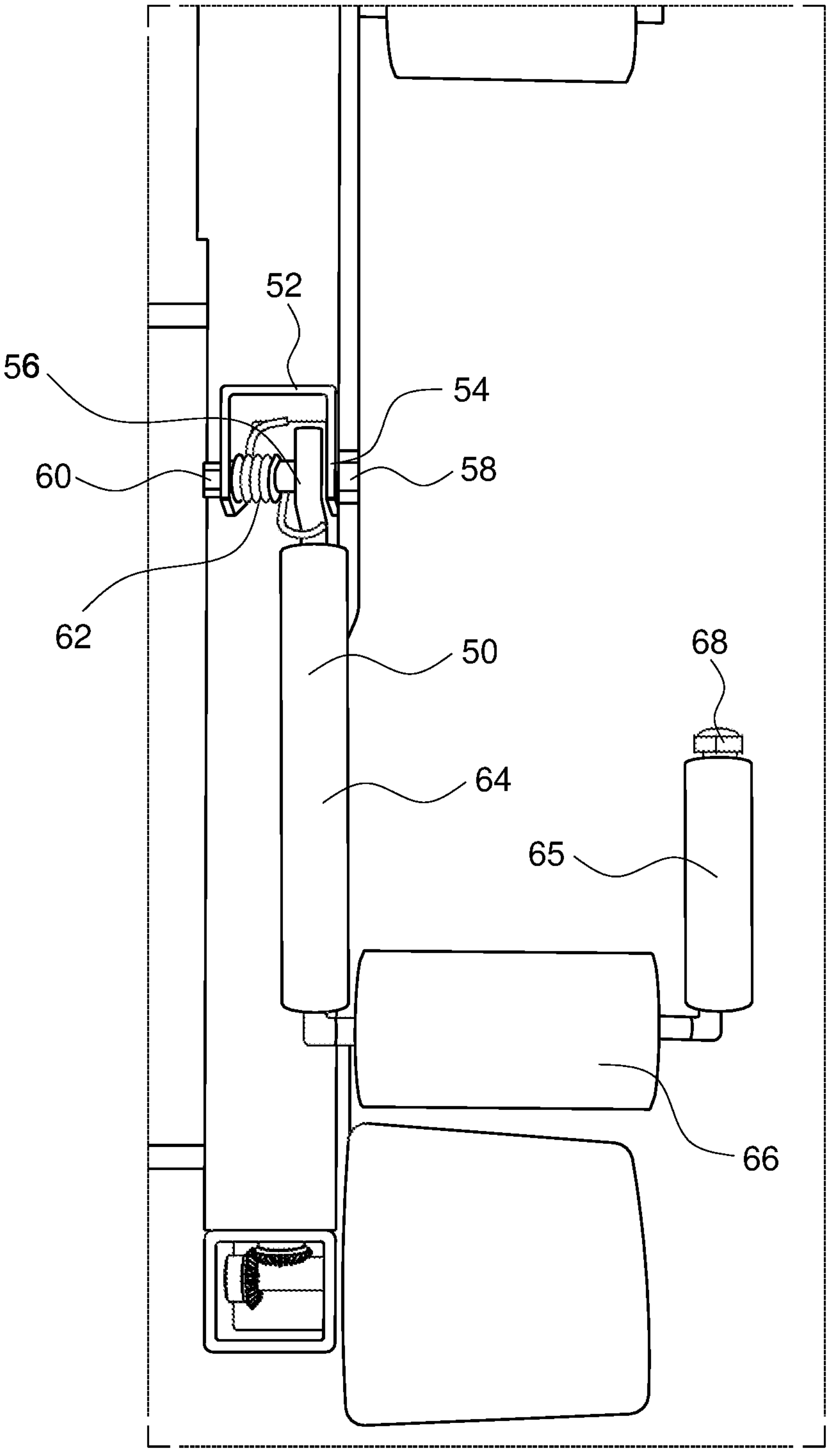
FIG. 8 is the front view of the device.

Once the hose 200 is completely rolled up on the drum the device is laid down as shown in FIG. 7.

Figure 6:
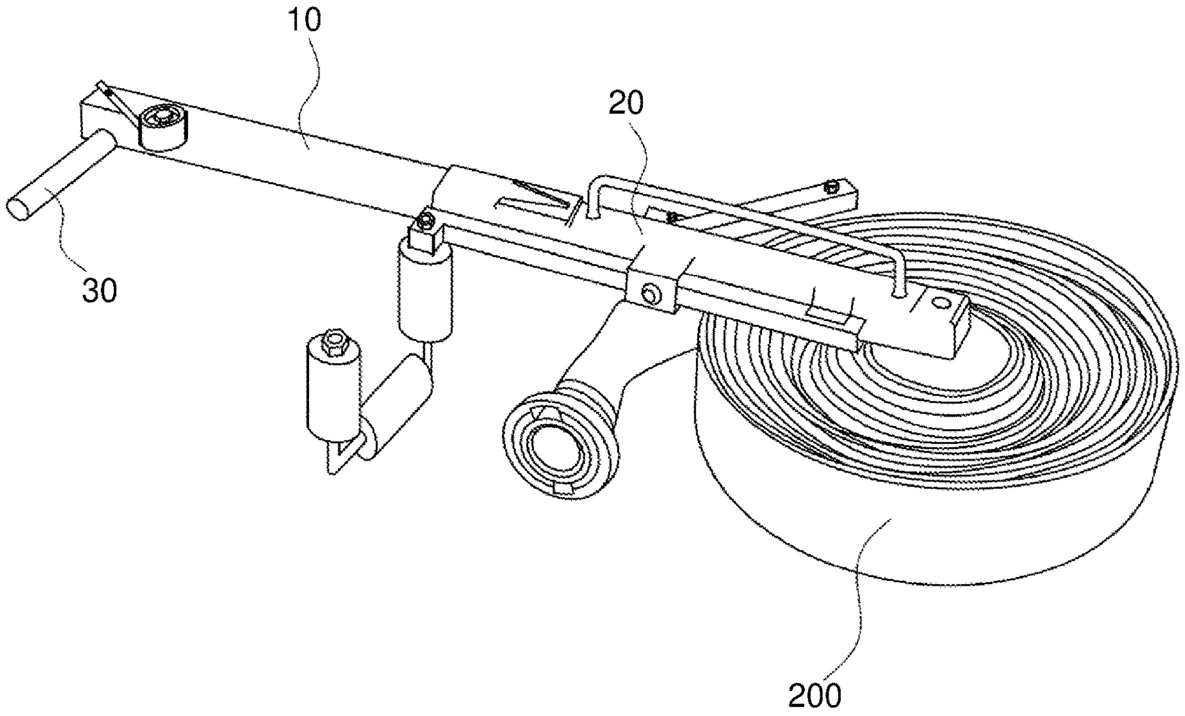
FIG. 6 is the device on the ground with a hose rolled up.

The user can then step on the top handle 30. As the user steps on the top handle the release arm abuts with the ground and the upper 10 and lower tube 20 pivot on the release arm pin 84. As the upper 10 and lower tube 20 pivot when the user steps on the top handle 30, the drum 180 is pushed upwards leaving the hose 200 rolled on the ground as shown in FIG. 6.

Figure 5:
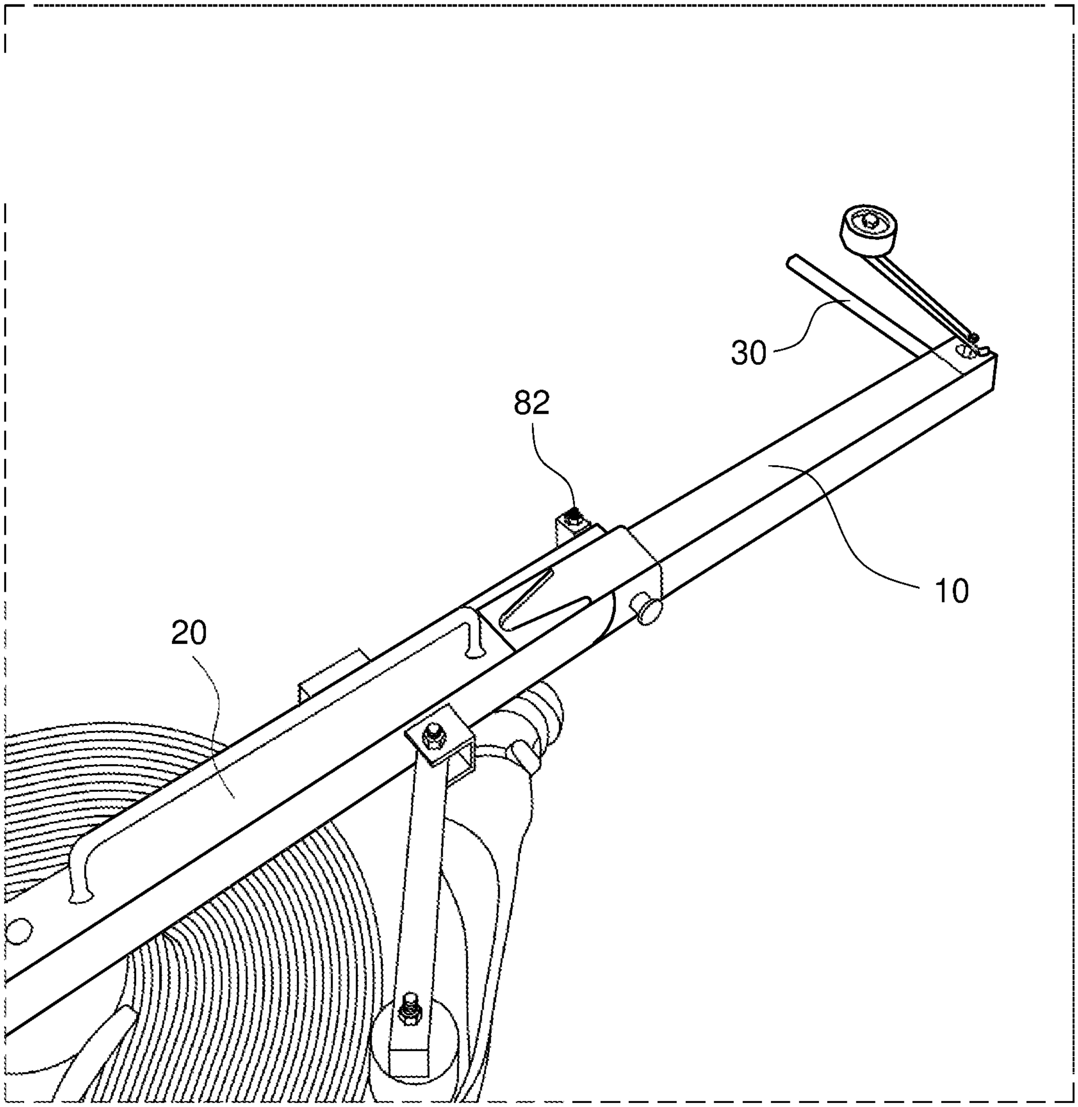
FIG. 5 displays a user stepping on the top handle to disengage the device from the hose.

If the device 5 is used to roll up a single layer hose 200, the hose 200 is first laid down on the ground flat. The end of the hose 200 is then inserted between the two drum arms 190, 192. The user then starts to rotate the crank handle 45, and as the crank handle 45 is rotated the drum 180 will rotate and the hose 200 is rolled around the drum 180. As the crank handle 45 is rotated the user will simultaneously walk toward the end of hose 200. Once the hose 200 is totally wrapped around the drum 180, the device 5 is then laid down on the ground as shown in FIG. 5. The user then steps on the top handle 30. As the user steps on the top handle 30, the release arm 80 abuts against the ground and the upper 10 and lower tube 20 will pivot on the release arm pin 84. As the drum 180 is raised, the hose 200 will remain flat on the ground as shown in FIG. 6.

An alternative rolling configuration is possible to roll a single layer hose 200, into a "Double Dutch" style roll. The two ends of the flat hose are brought directly adjacent each other creating two adjacent hose segments 202, 204, with a folded end at the far length of the hose. The end of the hose 200 is then inserted between the two drum arms 190, 192, with hose segments 202, 204 on either side of the dividing pole 76. The user then starts to rotate the crank handle 45, and as the crank handle 45 is rotated the drum 180 will rotate and the hose 200 is rolled around the drum 180. As the crank handle 45 is rotated the user will simultaneously walk toward the end of hose 200. Once the hose 200 is totally wrapped around the drum 180, as shown in FIG. 21, the device 5 is then laid down on the ground as shown in FIG. 5. The user then steps on the top handle 30. As the user steps on the top handle 30, the release arm 80 abuts against the ground and the upper 10 and lower tube 20 will pivot on the release arm pin 84.

Figure 22:
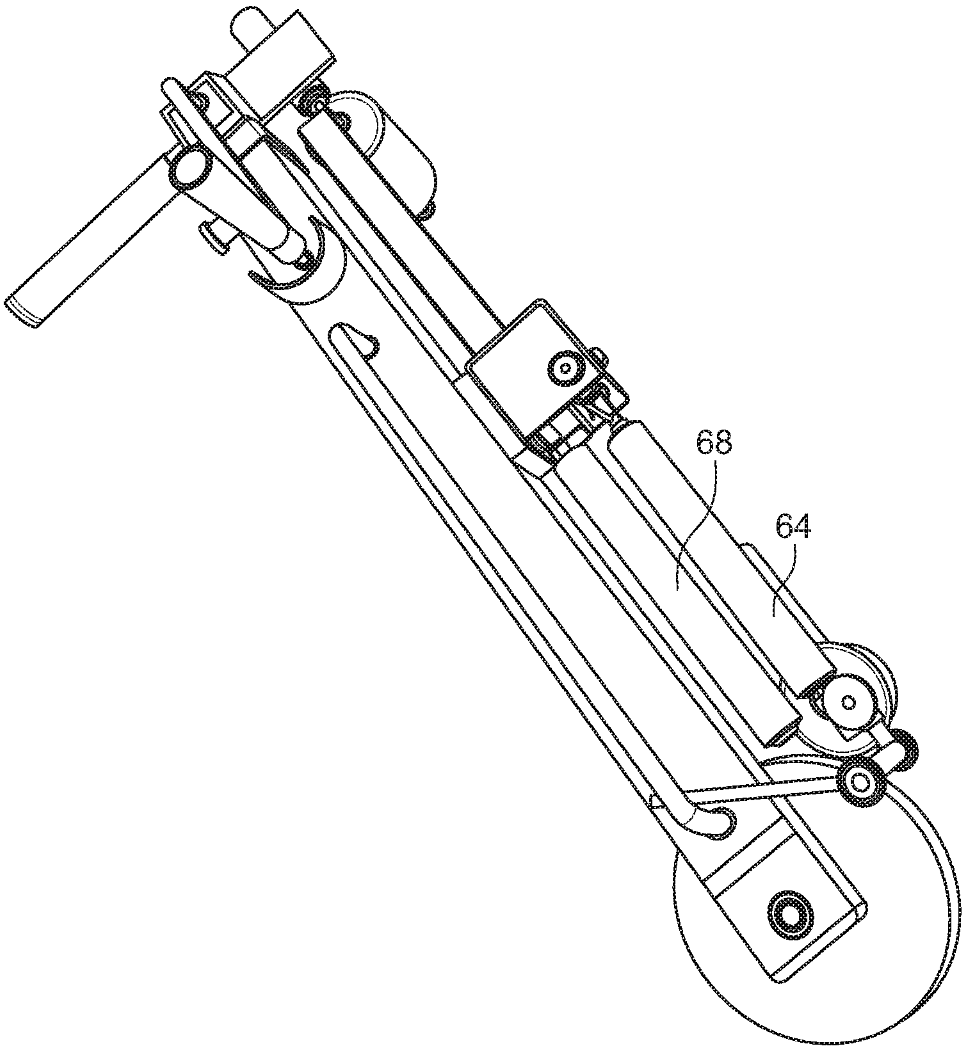
FIG. 22 is a side view of an embodiment with divider on the bottom roller and additional roller on release arm.
Figure 23:
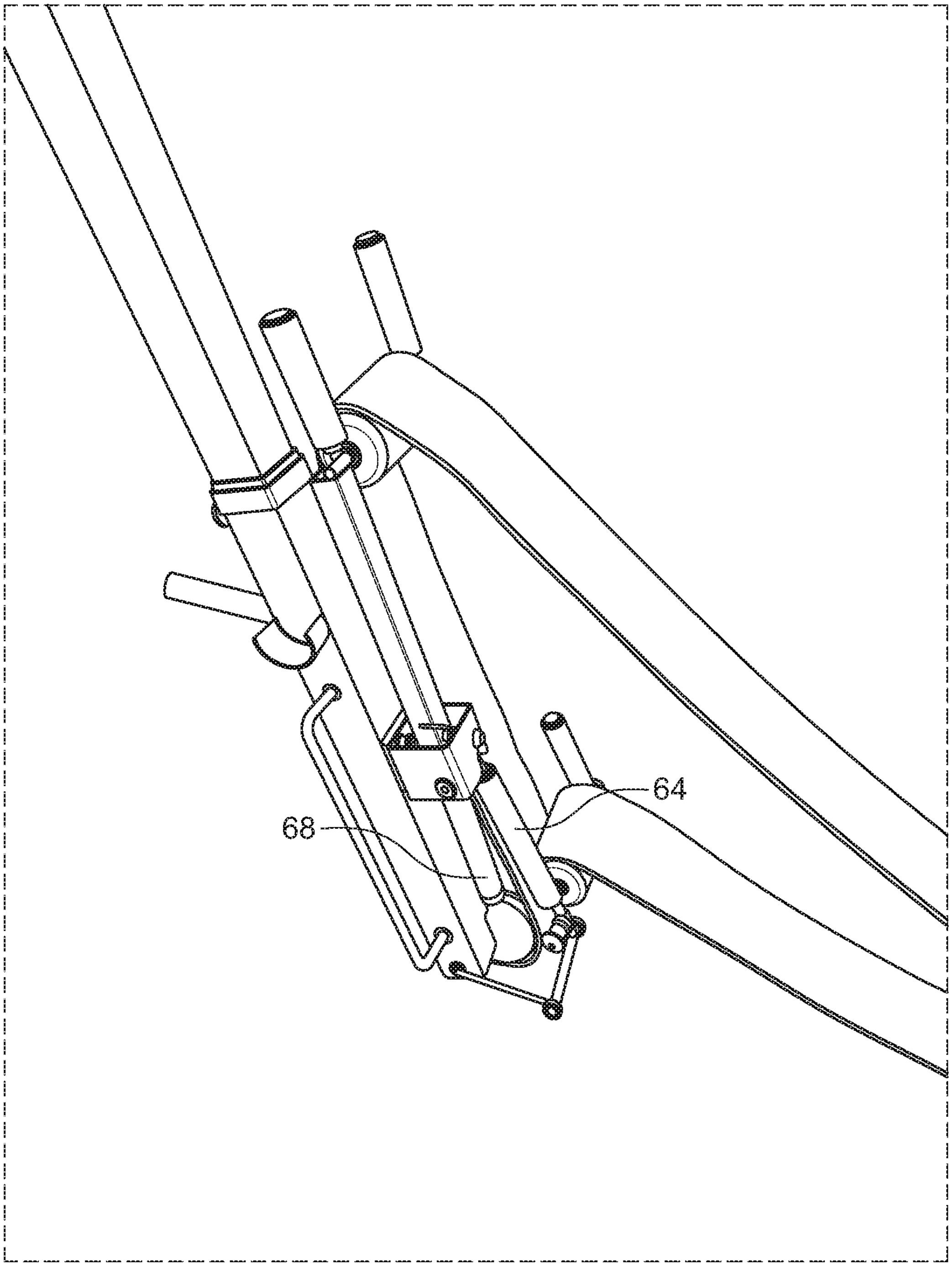
FIG. 23 is a side view of an embodiment with additional roller on release arm and divider placed to the side.
Figure 24:
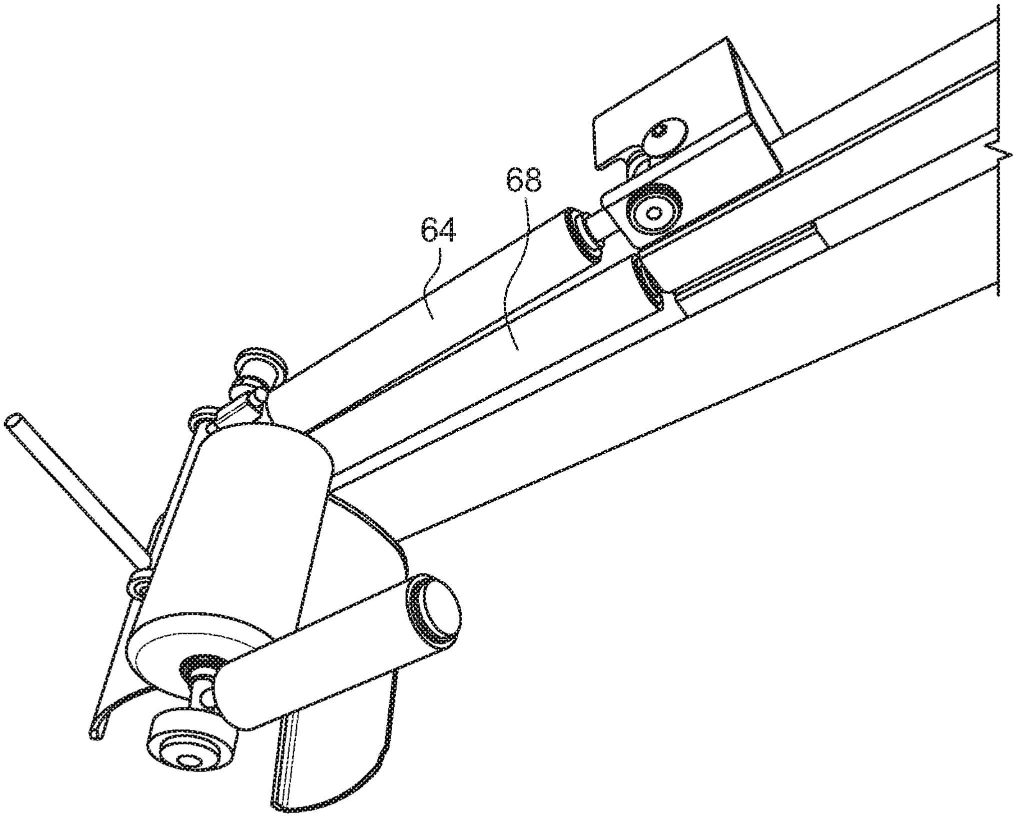
FIG. 24 is an embodiment with divider on the bottom roller and additional roller on the release arm.

Referring to FIG. 22, in an embodiment of the device, an additional supporting roller 68 is attached adjacent to side roller 64. The addition of the supporting roller 68 assists with reducing friction when rolling the hose. The supporting roller 68 reduces friction by rolling along the edge of the coiled hose 200, and not allowing the hose to contact the body of the device 20.

The device 5 rolls the hose 200 up leaving a centre hole in the rolled-up hose 200. This centre hole in the rolled-up hose 200 allows a user to simply place their hand in there for manual handling and ergonomics while handling the hose.

An alternative to the crank handle 45 can be the use of a connector wherein a power plant such as an electronic motor can be attached to drive the rotation. For example, the crank 40 can have a socketed end wherein an electronic impact wrench can be attached. The user can then simply attach an impact wrench to drive the device 5. This can be also in the form of removing the top assembly and fitting a power source to the main shaft 134 to drive the device 5.

If the hose 200 is not laid down flat on the ground, the swingarm 50 and release arm 80 are capable to realign the hose into the correct orientation as it is fed around the drum 180. This allows the user to roll up the hose by themselves with little to no preparation. Commonly flat hoses are used on firefighting trucks wherein the hose is compact.

LIST OF COMPONENTS

The drawings include the following integers.

5 Device
10 Upper tube
20 Lower Tube
22 Spring loaded pin
25 Lower tube handle
30 Top handle
40 Crank
45 Crank handle
50 Swing arm
52 Swing arm mount
54 Swing arm mount hole
56 Swing arm hole
58 Fastener
60 Nut
62 Spring
64 Side roller
65 Side roller
66 Lower roller
68 Supporting roller
68 End nut
70 Flange screw
72 Flange
74 Flange arm
76 Dividing pole
80 Release arm
82 Release arm mount
84 Release arm pin
86 Release arm top roller
88 Top roller fastener
90 Release arm top mount
92 Release arm top bar
94 Release arm top side roller
95 Release arm top side roller
96 Release arm top bottom roller
98 Top nut
100 Top nut
105 Top crank housing
107 Top crank housing roller
110 Crank shaft
120 Crank gear
125 Crank gear bearing
130 Main crank gear
132 Main crank gear bearing
134 Main shaft
136 Main shaft extension cover
145 Secondary shaft extension
150 Secondary shaft
155 Lower shaft gear
158 Lower shaft gear bearing
160 Drum gear
162 Drum gear bearing
164 Drum gear shaft
170 Drum gear housing
172 Drum gear housing orifice
180 Drum
185 Drum rear plate
190 Drum sides
192 Drum sides
195 Drum side edge
200 Hose
202 "Double Dutch" rolled hose first segment
204 "Double Dutch" rolled hose second segment Further advantages and improvements may very well be made to the present invention without deviating from its scope. Although the invention has been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus. Any discussion of the prior art throughout the specification should in no way be considered as an admission that such prior art is widely known or forms part of the common general knowledge in this field.

In the present specification and claims (if any), the word "comprising" and its derivatives including "comprises" and "comprise" include each of the stated integers but does not exclude the inclusion of one or more further integers.

The invention claimed is:

1. A device for winding up a hose, the device comprising:
vertically disposed elongated shaft having a top and a bottom;

a drum extending from the bottom of the shaft laterally to the shaft;

a drive mechanism adapted to rotatably drive the drum;

wherein the drive mechanism is rotated by a crank handle, the crank handle operably configured to transfer power through the shaft to rotate the drum; and a roller located above the drum and supported by the shaft so as to feed the hose onto the drum, wherein the hose is fed over the roller to then engage the drum, wherein the drive mechanism when operated winds the hose onto the drum; and wherein the device is configured such that in use the drum together with the hose wound thereon enables the device to be rolled along the ground.

2. The device in claim 1, wherein the roller comprises of a lower rolling element, and two side rolling elements on either side of the lower rolling element.

3. The device as in claim 2, wherein the side rolling elements are orientated upward.

4. The device as in claim 2, wherein the roller comprises a dividing pole suitable for dividing the hose into two segments to "Double Dutch" roll the hose.

5. The device as in claim 2, wherein comprising one or more additional supporting rolling elements located adjacent to at least one side rolling element located on either side of the lower rolling element.

6. The device as in claim 1, wherein the shaft is extendible.

7. The device as in claim 1, comprising further spaced apart rollers positioned above the drum.

* * * * *